(12) United States Patent
Flynn et al.

(10) Patent No.: US 11,088,873 B2
(45) Date of Patent: Aug. 10, 2021

(54) GATEWAY DEVICES COUPLED TO CONNECTION POINT DEVICE

(71) Applicant: HEWLETT-PACKARD DEVELOPMENT COMPANY, L.P., Houston, TX (US)

(72) Inventors: Thomas Joseph Flynn, Houston, TX (US); Christoph J. Graham, Houston, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 371 days.

(21) Appl. No.: 16/083,231

(22) PCT Filed: Apr. 20, 2017

(86) PCT No.: PCT/US2017/028538
§ 371 (c)(1),
(2) Date: Sep. 7, 2018

(87) PCT Pub. No.: WO2018/194608
PCT Pub. Date: Oct. 25, 2018

(65) Prior Publication Data
US 2020/0313930 A1    Oct. 1, 2020

(51) Int. Cl.
*H04L 12/66* (2006.01)
*H04L 29/08* (2006.01)
(Continued)

(52) U.S. Cl.
CPC .............. *H04L 12/66* (2013.01); *H04L 67/12* (2013.01); *H04L 67/2819* (2013.01);
(Continued)

(58) Field of Classification Search
CPC ..... H04L 12/66; H04L 29/08; H04L 41/0654; H04L 41/0668; H04L 43/0829;
(Continued)

(56) References Cited

U.S. PATENT DOCUMENTS 6,928,576 B2 * 8/2005 Sekiguchi ................. H04L 1/22
370/219
7,152,179 B1 * 12/2006 Critchfield .............. H04L 12/56
714/4.11
(Continued)

FOREIGN PATENT DOCUMENTS

CN          102769973 A    11/2012
WO       2015194821 A1    12/2015

OTHER PUBLICATIONS

Scazzoli et al, A Redundant Gateway Prototype for Wireless Avionic Sensor Networks, IEEE, 7 pages, Oct. 2017.*
(Continued)

*Primary Examiner* — Frank Duong
(74) *Attorney, Agent, or Firm* — HP Inc. Patent Department (57) ABSTRACT

Example implementations relate to gateway devices coupled to a connection point device. A system can include a first gateway device communicatively coupled to a connection point device and a second gateway device. The second gateway device can be communicatively coupled to the connection point device and the first gateway device and can take control of a portion of the connection point device in response to a failure of the first gateway device.

18 Claims, 5 Drawing Sheets

(51) Int. Cl.
*H04W 40/22* (2009.01)
*H04W 40/36* (2009.01)
*H04W 88/16* (2009.01)

(52) U.S. Cl.
CPC .......... *H04W 40/22* (2013.01); *H04W 40/36* (2013.01); *H04W 88/16* (2013.01)

(58) Field of Classification Search
CPC ......... H04L 43/10; H04L 45/22; H04L 45/28; H04L 47/74; H04L 47/746; H04L 67/10; H04L 67/12; H04L 67/125; H04L 67/2819; H04L 69/40; H04W 4/70; H04W 40/22; H04W 40/36; H04W 88/16
See application file for complete search history.

(56) References Cited

U.S. PATENT DOCUMENTS

| | | | | |
|---|---|---|---|---|
| 7,743,155 | B2 | 6/2010 | Pisharody et al. | |
| 8,325,740 | B2* | 12/2012 | Kok | H04W 24/04 370/401 |
| 8,812,894 | B2* | 8/2014 | Hammam | H04L 61/2521 714/4.11 |
| 9,686,184 | B2* | 6/2017 | Rucker | H04W 4/70 |
| 10,805,147 | B2* | 10/2020 | Cheng | H04L 45/22 |
| 2002/0176355 | A1* | 11/2002 | Mimms | H04L 49/552 370/216 |
| 2006/0015586 | A1 | 1/2006 | Sharma | |
| 2009/0154343 | A1 | 6/2009 | Fitch et al. | |
| 2016/0234312 | A1 | 8/2016 | Vasamsetti et al. | |
| 2017/0063605 | A1 | 3/2017 | Cheng et al. | |
| 2017/0063823 | A1 | 3/2017 | Cheng et al. | |
| 2017/0094033 | A1* | 3/2017 | Sathyadevan | H04L 67/12 |
| 2018/0139274 | A1* | 5/2018 | Gandhi | H04L 47/803 |
| 2019/0357339 | A1* | 11/2019 | Kim | H04Q 9/00 |

OTHER PUBLICATIONS

"Fault Tolerant IoT Architecture", Retrieved from Internet—http://embeddedexperience.blogspot.com/2014/08/fault-tolerant-iot-architecture.html, Aug. 21, 2014, 5 Pages.

Karthikeya et al., "Leveraging Solution-Specific Gateways for Cost-Effective and Fault-Tolerant IoT Networking", IEEE Wireless Communications and Networking Conference (WCNC 2016)—Track 4—Services, Applications, and Business, Retrieved from internet—https://ieeexplore.ieee.org/document/7564811/authors#authors, 2016, 6 Pages.

Anonymous, "Corrected Rail Solution Design Guide", Cisco Systems Inc., Nov. 1, 2016, pp. 1-42, Retrieved from the Internet: <https://www.cisco.com/c/dam/en_us/solutions/industries/docs/cts-dg.pdf> [retrieved on Aug. 19, 2019].

* cited by examiner

GATEWAY DEVICES COUPLED TO CONNECTION POINT DEVICE

BACKGROUND

A gateway is a network node connecting two networks that use different protocols. An Internet of Things (IoT) gateway is a device that can allow legacy devices to report data using the Internet, participating in the IoT concept, and/or enabling technologies or systems with disparate protocols to interact with one another. An IoT gateway can facilitate the reporting of data (e.g., data acquisition) from connected sensors or other gateways to a remote location (e.g., data ingestion service).

DETAILED DESCRIPTION

A gateway device, for instance an IoT gateway device, can be used to connect a sensor or sensors to a cloud service. The gateway device can decide locally on control actions or pass control to a cloud service. For instance, a managed device such as a windmill may reside off-shore or in an isolated area. A sensor can monitor a condition of the windmill and pass condition information to a local gateway device. The local gateway device can take corrective action on errors and send alerts to the cloud service for service scheduling. If a failure occurs on the gateway device, information flow may stop, the windmill sensor is unmonitored, and information is not gathered. Corrective actions may include dispatch of a service technician for repair.

Some approaches to addressing failure issues include connecting a gateway with an Internet protocol (IP) communication capability on one side, and a direct communication channel to a managed and/or monitored device. The information from the managed device is gathered and sent along. However, the connections are non-routable and singular such that there is no redundancy available.

Examples of the present disclosure can utilize a plurality of gateway devices working together. A managed device in communication with the gateway devices can be routable or non-routable. As used herein, routable device, ports, etc. can include a communications protocol that includes a network address and a device address such that packets can be forwarded from one network to another. Non-routable device, ports, etc. can include a communications protocol including a device address, but not a network address, such that an addressing scheme is not incorporated for sending data from one network to another.

By having a shared connection point device between the gateway devices, fault tolerance may be available for both routable and non-routable managed devices without having to re-wire or wire within a system or define a new communication protocol that introduces redundancy. For instance, fault tolerance (e.g., in the event of a device failure) can be provided without physical intervention. Because the sensors of a managed device may be in a difficult location such as on a windmill, on an airplane or airplane engine, on a diesel generator on an oil well, etc., fault tolerance in accordance with the present disclosure can allow for sensors to remain monitored while a service technician is dispatched for repair.

Figure 1:
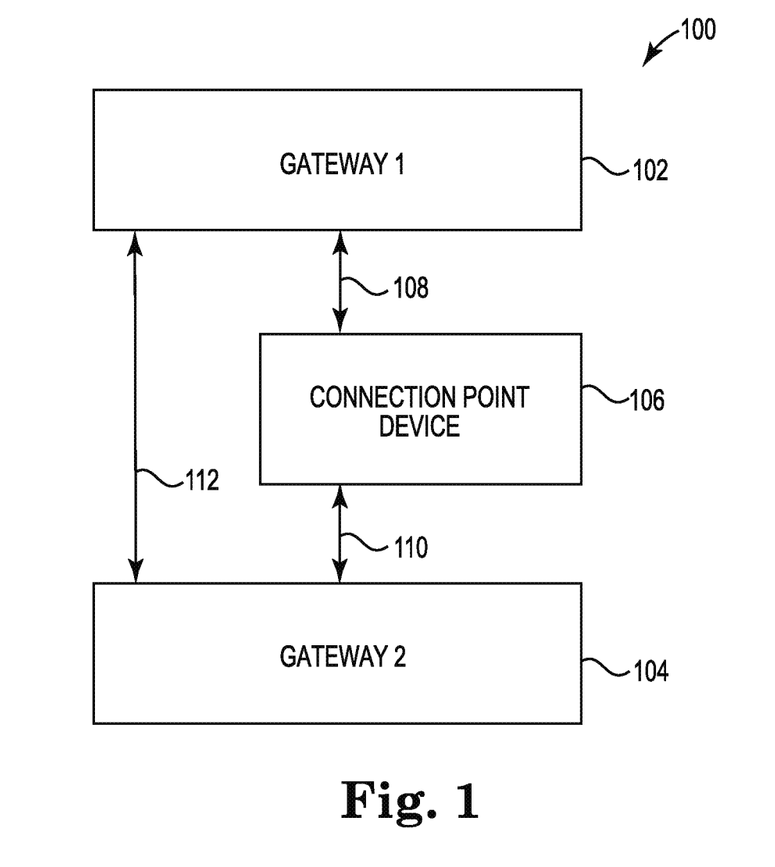
FIG. 1 illustrates a diagram of a system including a first gateway device, a second gateway device, and a connection point device.

FIG. 1 illustrates a diagram of a system 100 including a first gateway device 102, a second gateway device 104, and a connection point device 106. As used herein, a gateway device (e.g., first gateway device 102 and second gateway device 104) can include network nodes equipped for interfacing with another network that uses different protocols. In some examples, first gateway device 102 and second gateway device 104 can be IoT gateway devices. For instance, first gateway device 102 and second gateway device 104 can be devices that connect non-IP sensors to the Internet.

As used herein, a connection point device (e.g., connection point device 104) can include a device to facilitate communication between a gateway device and a cloud service (not illustrated) and/or a managed device (not illustrated). For instance, connection point device 104 can facilitate communication between gateway device 104 (or gateway device 102) and a cloud service and/or a managed device. As used herein, a cloud service can include a service made available via the Internet from a cloud computing provider's servers. In some examples a service can be made available to via the Internet from personal or on-premises servers.

In some examples a connection point device (e.g., connection point device 104) can be an input/output (I/O) device having a plurality of ports. The ports can include, for instance, routable ports and/or non-routable ports, including Ethernet ports and serial ports, among others. The connection point device can include, for instance, local radios including a private wireless communication protocol.

First gateway device 102 can be communicatively coupled to connection point device 106 via connection 108. As used herein, communicatively coupled can include coupled via various wired and/or wireless connections between devices such that data can be transferred in various directions between the devices. Connection 108 can be a physical connection including, for instance, a cable, an interconnect, and/or other physical connections. Second gateway device 104 can be communicatively coupled to connection point device 106 via connection 110. Connection 110 can be a physical connection including, for instance, a cable, an interconnect, and/or other physical connections.

First gateway device 102 and second gateway device 104 can each control a portion of connection point device 106. For instance, first gateway device 102 can control certain ports of connection point device 106, and second gateway device can control other ports of connection point device 106. In some instances, first gateway device 102 can have complete or near-complete control of connection point device 106.

First gateway device 102 and second gateway device 104 can be communicatively coupled to each other and can monitor each other. For instance, first gateway device 102 and second gateway device 104 can be communicatively coupled via a non-face communication connection. In some examples, first gateway device 102 can monitor, via a first daemon, a connection to second gateway device 104. The first daemon can alternatively or additionally monitor a connection to connection point device 106. Similar, second gateway device 104 can monitor, via a second daemon, a connection to first gateway device 102. Additionally or alternatively, the second daemon can also monitor a connection to connection point device 106. In such an example, first gateway device 102 and second gateway device 104 are network connected.

If during monitoring, second gateway device 104 detects a failure of first gateway device 104, second gateway device can take control of the portion of connection point device 106 under the control of first gateway device 104. This can act as fault tolerance for system 100. In some instances, first gateway device 102 and second gateway device 102 include instructions executable by a processing resource to perform functions, for instance, taking control of another gateway device's portion of connection point device 106.

In some instances, second gateway device 104 can transition from a standby configuration mode to an active configuration mode in response to the failure of first gateway device 102 as will be discussed further herein with respect to FIG. 2. For instance, second gateway device 104 can include instructions executable by the processing resource to perform the transition. In some examples, second gateway device 104 can assume an identity of first gateway device 102 in response to the failure of first gateway device 102. For instance, second gateway device 104 can include instructions executable by the processing resource to perform the identity assumption.

In some examples, second gateway device 104 can transition from a passive configuration mode to an active configuration mode in response to the failure of first gateway device 102 as will be discussed further herein with respect to FIG. 3. For instance, second gateway device 104 can include instructions executable by the processing resource to perform the transition. In some instances, in response to the failure of first gateway device 102, second gateway device 104 can be in an active configuration mode and can transition to perform duties of second gateway device 104 and duties performed by first gateway device 102 prior to failure as will be discussed further herein with respect to FIG. 4. For instance, second gateway device 104 can include instructions executable by the processing resource to perform the transition.

In some examples, system 100 can include a managed device (not illustrated) and a cloud service (not illustrated). The managed device can include a device that can receive and/or send instructions and information from and/or to other aspects of a network and/or system. For instance, the managed device can receive instructions from or send information to connection point device 106, which can be communicatively coupled to first and second gateway devices 102 and 104. The managed device can include, for instance, a windmill, an airplane engine, or other device to be managed and from which status information is desired. For instance, sensors on an airplane engine may pass along information about the working status of the airplane engine. The managed device can be communicatively coupled to connection point device 106. First gateway device 102 and second gateway device 104 can be communicatively coupled to the cloud service to communication status information, in some examples.

Figure 2:
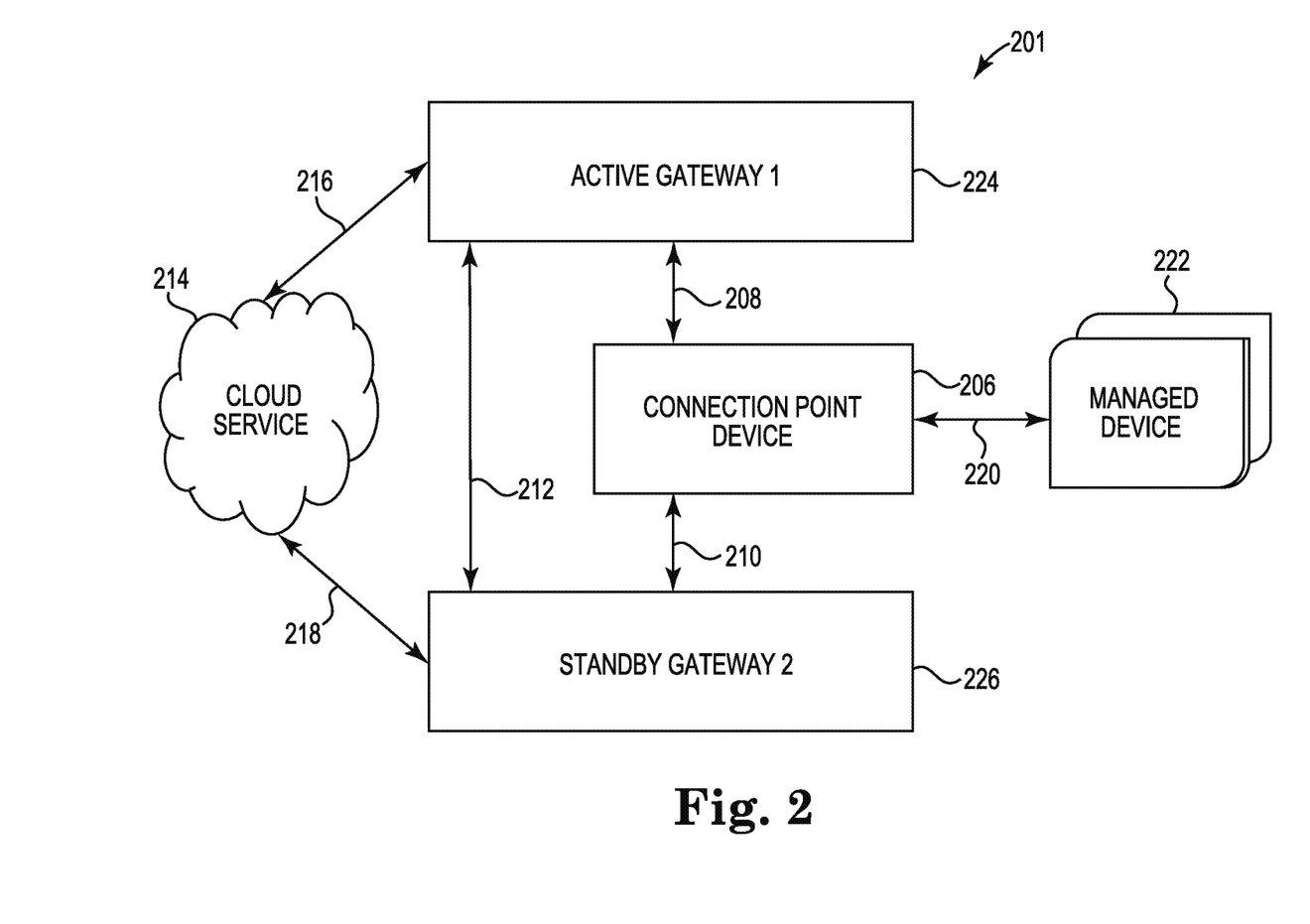
FIG. 2 illustrates a diagram of a system including a managed device, a cloud service, a first gateway device, a second gateway device; and a connection point device.

FIG. 2 illustrates a diagram of a system 201 including a managed device 222, a cloud service 214, a first gateway device 224, a second gateway device 226, and a connection point device 206. In the example illustrated in FIG. 2, first gateway device 224 is an active gateway device, and second gateway device 226 is a standby gateway device. First gateway device 224 and second gateway device 226 can be IoT gateway devices in some examples.

Connections 216, 218, 208, 210, and 220 illustrated in FIG. 2 can be physical connections, wireless connections, and or a combination thereof. For instance, connections 208, 210, and 220 may be physical connections, while connections 216 and 218 may be wireless connections. Connections 216, 218, 208, 210, and 220 can be routable connection, non-routable connections, or a combination thereof.

Standby gateway device 226 can sit in a standby configuration state such that it is not fully booted and performing limited functions. For instance, standby gateway device 226 may be running a process that is monitoring a state of connection point device 206 and/or active gateway device 224, but performing no other functions. Connection point device 206 can be a shared I/O device between standby gateway device 226 and active gateway device 224 and can be communicatively coupled to each via connections 210 and 208, respectively.

Active gateway device 224 can be in an active state such that it is performing functions, running processes and sharing information with connection point device 206 via connection 208, standby gateway device 226 via connection 212, and/or cloud service 214 via connection 216, for instance. Put another way, active gateway device 224 can be active such that it can actively process a set of data associated with managed device 222, actively communicated the processed set of data with cloud service 214, and actively share state information with standby gateway device 226 via connection 212. Managed device 222 can be communicatively coupled to connection point device 206 via connection 220 and can be routable or non-routable.

Active gateway device 224 can monitor, via a first daemon, a connection (e.g., connection 212) to standby gateway device 226 and a connection (e.g., connection 208) to connection point device 206. Similar, standby gateway device 226 can monitor, via a second daemon, a connection (e.g., connection 212) to active gateway device 224 and a connection (e.g., connection 210) to connection point device 206.

Standby gateway device 226 can determine active gateway device 224 has entered a failure state when it ceases to receive communication from active gateway device 224. In response, standby gateway device 226 can leave its standby configuration and take over an identity of active gateway device 224. For instance, standby gateway device 226 can boot and take the name and other properties of active gateway device 224. Upon takeover, standby gateway device 226 can communicate with connection point 206 to cancel communication between active gateway device 224 and connection point device 206. Put another way, standby gateway device 226 executes exclusive ownership of connection point device 206. In some examples, upon takeover, standby gateway device 226 can take over responsibilities of active gateway device 224 and manage managed device 222.

Figure 3:
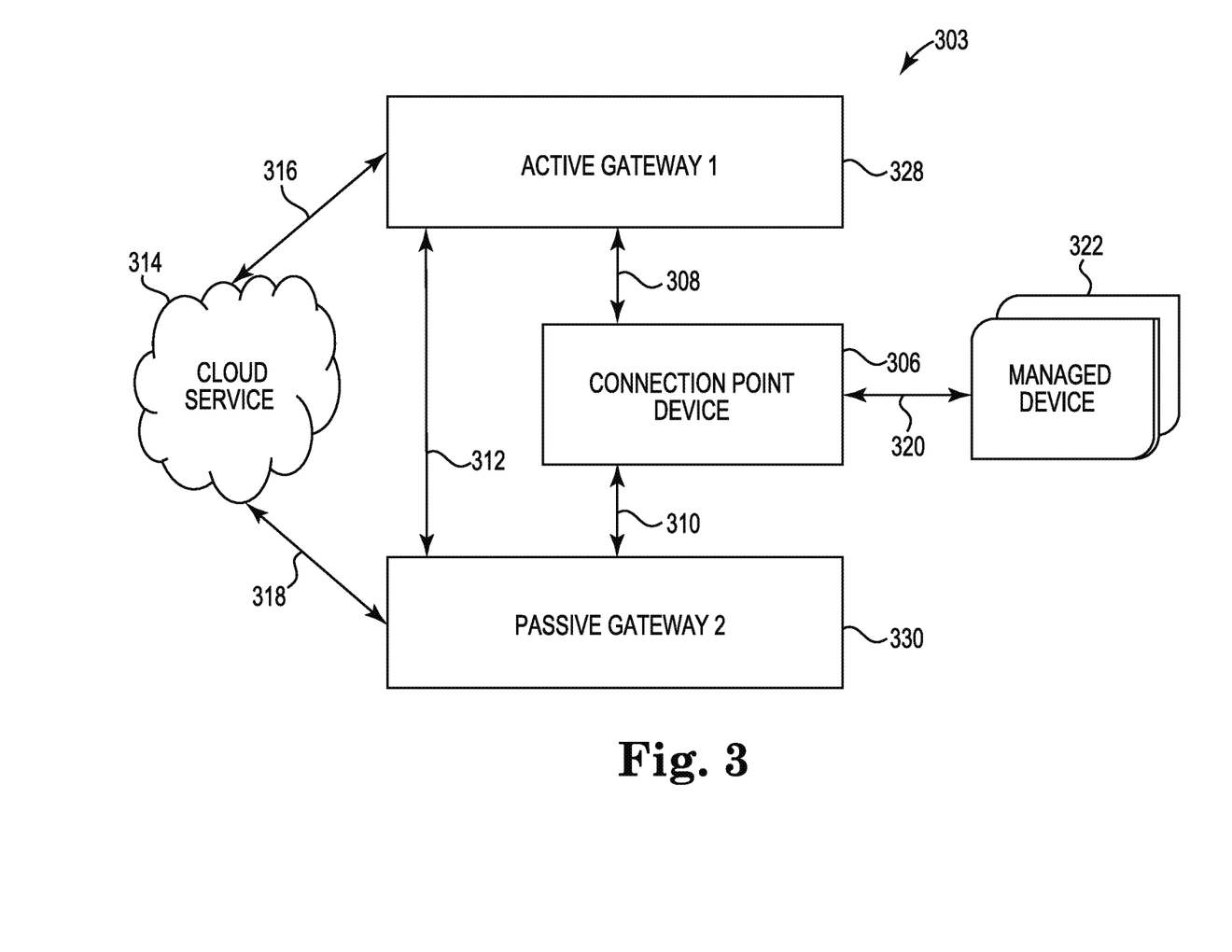
FIG. 3 illustrates another diagram of a another system including a managed device; a cloud service, a first gateway device, a second gateway device, and a connection point device.

FIG. 3 illustrates a diagram of another system 303 including a managed device 322, a cloud service 314, a first gateway device 328, a second gateway device 330, and a connection point device 306. In some examples, first gateway device 328 can be IoT gateway device in an active state, and second gateway device 330 can be IoT gateway device in a passive state. Connection point device 306 can be a shared I/O connection point device between active gateway device 328 and passive gateway device 330.

Connections 316, 318, 308, 310, and 320 illustrated in FIG. 3 can be physical connections, wireless connections, and or a combination thereof. For instance, connections 308, 310, and 320 may be physical connections, while connections 316 and 318 may be wireless connections. Connections 316, 318, 308, 310, and 320 can be routable connection, non-routable connections, or a combination thereof.

In some examples, system 303 can include connection point device 306 can be communicatively coupled to a managed device 322, which can be routable or non-routable, via connection 320. Connection point device 306 can also be communicatively coupled to active gateway device 328 via connection 308 and passive gateway device 330 via connection 310. System 303 can further include a cloud service communicatively coupled via connections 316 and 318, respectively, to active gateway device 328 and passive gateway device 330.

In some examples, active gateway device 328 can be active such that it can actively process a set of data associated with managed device 322, actively communicated the processed set of data with cloud service 314, and actively share state information with passive gateway device 330 via connection 312. Passive gateway device 330 can be passive such that it can actively share state information with active gateway device 328 via connection 312, but it may not actively process data associated with managed device 322.

Active gateway device 328 can monitor, via a first daemon, a connection (e.g., connection 312) to passive gateway device 330 and a connection (e.g., connection 308) to connection point device 306. Similar, passive gateway device 330 can monitor, via a second daemon, a connection (e.g., connection 312) to active gateway device 328 and a connection (e.g., connection 310) to connection point device 306.

In some examples, in response to a failure of active gateway device 328, passive gateway device 330 can process the set of data processed by active gateway device 328 prior to failure, and communicate the processed set of data with cloud service 314. For instance, passive gateway device 330 can include instructions executable by a processing resource to transition passive gateway device 330 from a passive configuration mode to an active configuration mode in response to a failure of active gateway device 328. Because passive gateway device 330 can be in a fully running state, it may not have to fully boot before a transition following failure of active gateway device 328. In some examples, passive gateway device 330 does not assume an identity of active gateway device 328, but does takeover control of connection point device 306 and any ports on connection point device 306 controlled by active gateway device 328 prior to failure.

Figure 4:
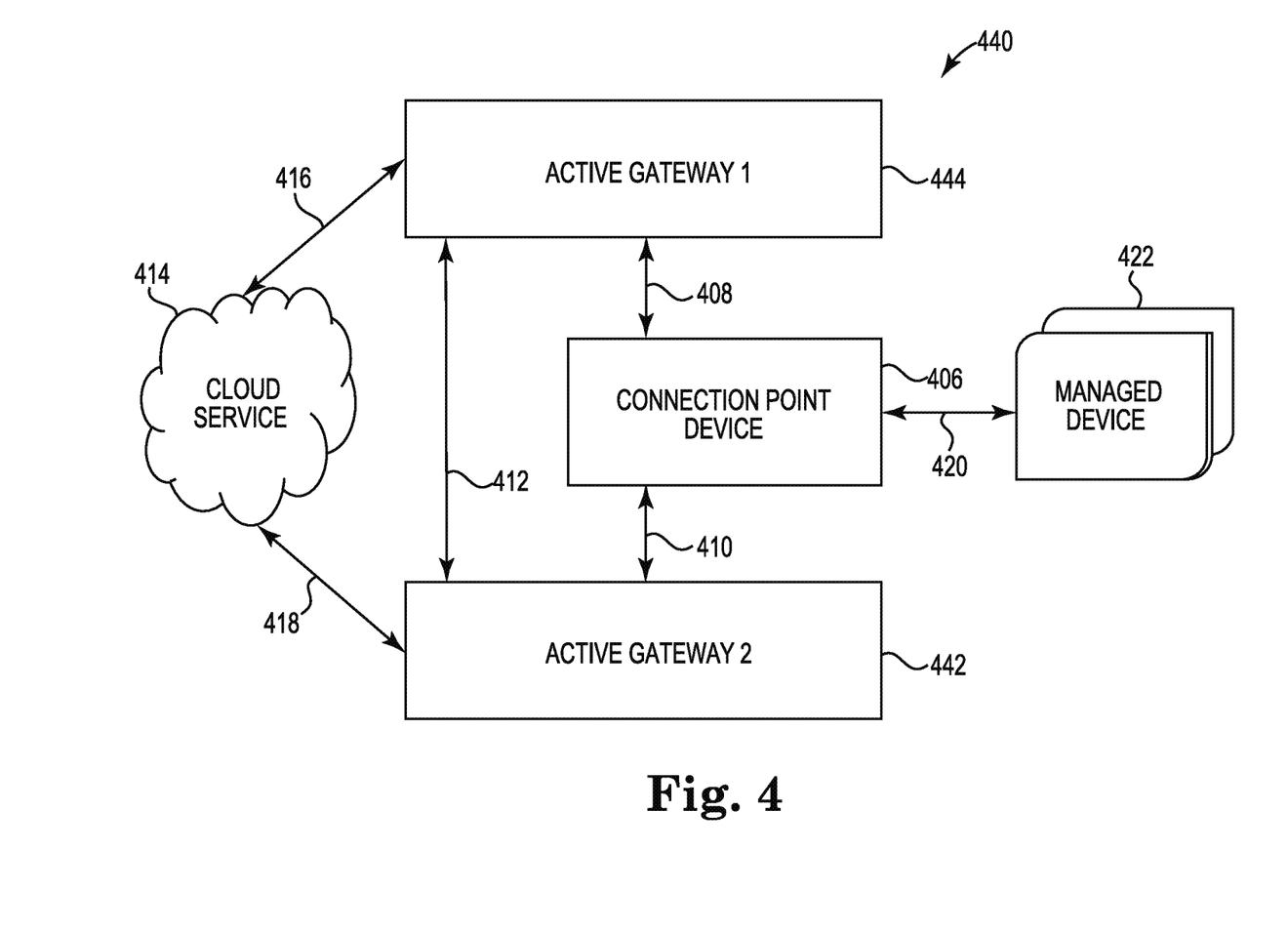
FIG. 4 illustrates another diagram of a another system including a managed device, a cloud service, a first gateway device, a second gateway device, and a connection point device.

FIG. 4 illustrates a diagram of a another system 440 including a managed device 422, a cloud service 414, a first gateway device 444, a second gateway device 442, and a connection point device 406. In some examples, first gateway device 444 and second gateway device 442 can be IoT gateway devices and both gateway devices can be in an active state. Connection point device 406 can be a shared I/O connection point device between active gateway device 444 and active gateway device 442.

Connections 416, 418, 408, 410, and 420 illustrated in FIG. 4 can be physical connections, wireless connections, and or a combination thereof. For instance, connections 408, 410, and 420 may be physical connections, while connections 416 and 418 may be wireless connections. Connections 416, 418, 408, 410, and 420 can be routable connection, non-routable connections, or a combination thereof.

For example, system 440 can include connection point device 406 communicatively coupled to managed device 422 via connection 420, active gateway device 444 via connection 408, and active gateway device 442 via connection 410. In some examples, connections 408, 410, and 420 can be physical connections, wireless connections, and/or a combination thereof. Managed device 422 in some examples can be a routable managed device and in some examples can be a non-routable managed device.

Active gateway device 444 can be in an active state such that it can actively process a first set of data associated with managed device 422, actively communication the processed first set of data with cloud service 414, and actively share state information with active gateway device 442 via a non-routable connection 412. Active gateway device 442 can be in an active state such that it can actively process a second set of data associated with managed device 422, actively communication the processed second set of data with cloud service 414, and actively share state information with active gateway device 444 via a non-routable connection 412.

Active gateway device 442 and active gateway device 444 can actively process transaction information associated with connection point device 406 via connections 410 and 408, respectively, and/or active gateway device 442 and active gateway device 444 can actively process transaction information associated with cloud service 414 via connections 418 and 416, respectively. In some examples, active gateway device 442 and active gateway device 444 can each be performing approximately the same amount of work. As used herein, "approximately" may include an amount within a particular margin, range, and/or threshold. Active gateway device 442 and active gateway device 444 can concurrently run at approximately full capacity in some instances.

Active gateway device 444 can monitor, via a first daemon, a connection (e.g., connection 412) to active gateway device 442 and a connection (e.g., connection 408) to connection point device 406. Similar, active gateway device 442 can monitor, via a second daemon, a connection (e.g., connection 412) to active gateway device 444 and a connection (e.g., connection 410) to connection point device 406.

In some examples, in response to a failure of active gateway device 444, active gateway device 442 can assume duties of both active gateway device 444 and active gateway device 442. For instance, active gateway device 442 can process the first set of data and the second set of data and/or take control of ports of connection point device 406 controlled by active gateway device 444 before the failure of active gateway device 444. In some examples, a transition from both active gateway device 442 and active gateway device 444 processing data to just active gateway device 442 processing data in response to a failure of active gateway device 444 can be approximately instantaneous. For example, because active gateway 442 is already actively processing data, it does not need to boot up in order to begin actively processing data.

In some instances, systems 100, 201, 303, and 440 can be communicatively coupled to or be part of a computing system including a processing resource, a memory resource, and a number of modules according to an example. The computing system can utilize instructions (e.g., software and/or firmware) hardware, and/or logic to perform a number of functions including those described herein. The computing system can be a combination of hardware and program instructions configured to share information. The hardware, for example, can include a processing resource and/or a memory resource (e.g., computer readable medium (CRM), machine readable medium (MRM), etc., database, etc.).

A processing resource, as used herein, can include a processor capable of executing instructions stored by a memory resource. Processing resource can be implemented in a single device or distributed across multiple devices. The program instructions (e.g., machine-readable instructions (MRI)) can include instructions stored on the memory resource and executable by the processing resource to implement a desired function (e.g., fault tolerance, configuration transition, etc.).

The memory resource can be in communication with a processing resource. A memory resource, as used herein, can include memory components capable of storing instructions that can be executed by processing resource. Such memory resource can be a non-transitory CRM or MRM. Memory resource can be integrated in a single device or distributed across multiple devices. Further, memory resource can be fully or partially integrated in the same device as processing resource or it can be separate but accessible to that device and processing resource. Thus, it is noted that the computing system can be implemented on a participant device, on a server device, on a collection of server devices, and/or a combination of the user device and the server device.

The memory resource can be in communication with the processing resource via a communication link (e.g., a path). The communication link can be local or remote to a machine (e.g., a computing system) associated with the processing resource. Examples of a local communication link can include an electronic bus internal to a machine (e.g., a computing system) where the memory resource is one of volatile, non-volatile, fixed, and/or removable storage medium in communication with the processing resource via the electronic bus.

A module and/or modules can include MRI that when executed by the processing resource can perform a number of functions including those described herein. The number of modules can be sub-modules of other modules.

Each of the number of modules can include instructions that when executed by the processing resource can function as a corresponding engine.

In some examples, engines can be part of a system (not illustrated in FIG. 1) including a database, a subsystem, and the number of engines. The subsystem can include the number of engines in communication with the database via a communication link. The system can represent instructions and/or hardware of a network controller.

The number of engines can include a combination of hardware and programming to perform functions including those described herein. The instructions can include instructions (e.g., software, firmware, etc.) stored in a memory resource (e.g., CRM, MRM, etc.) as well as hard-wired program (e.g., logic).

In some examples, the number of modules can be used in a software-as-a-service delivery model. For instance, components of computing system can exist in a single computing system or multiple computing systems (e.g., distributed). For example, a web server or other computing system that is trusted by the user can provide services to a server of individual data streams, and/or act on behalf of the user as a processing agent for recovery.

Figure 5:
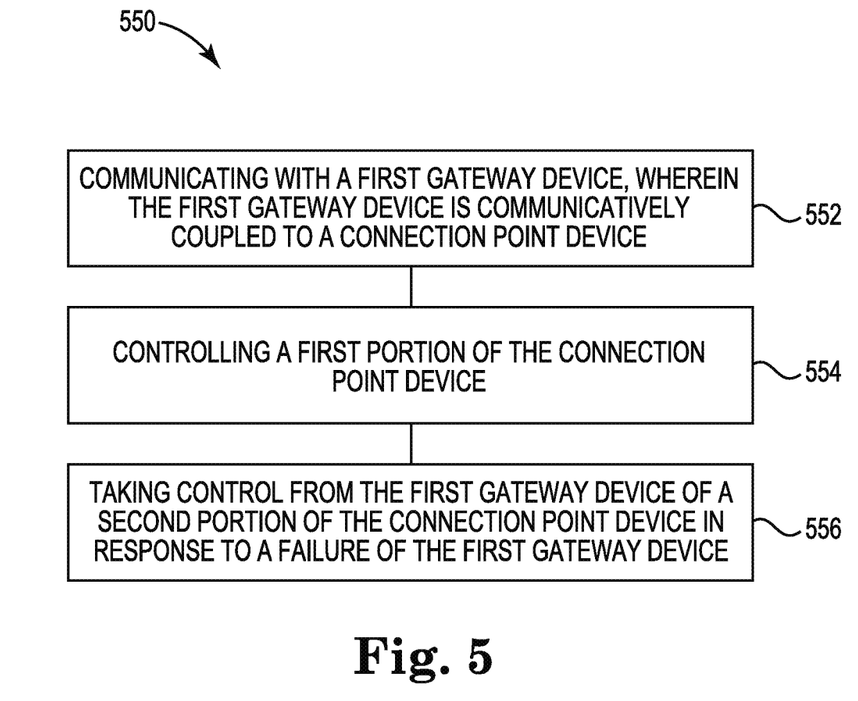
FIG. 5 illustrates a diagram of a method associated with gateway devices coupled to a connection point device according to an example.

FIG. 5 illustrates a diagram of a method 550 associated with gateway devices coupled to a connection point device according to an example. At 552, method 550 can include communicating with a first gateway device, wherein the first gateway device is communicatively coupled to a connection point device. For instance, a second gateway device can communicate with a first gateway device via a connection. The first and second gateway devices, in some examples, can be IoT gateway devices and the connection point device can be an I/O device.

At 554, method 550 can include controlling a first portion of the connection point device. For instance, certain ports of the connection point can be controlled. Depending on the configuration of the second gateway device controlling the first portion, control can vary from minor control (e.g., standby configuration mode) to shared complete control (e.g., active configuration mode).

At 556, method 550 can include taking control from the first gateway device of a second portion of the connection point device in response to a failure of the first gateway device. For instance, a second gateway device can act as fault tolerance for the first gateway device, as discussed with respect to FIGS. 2, 3, and 4.

Some examples can include transitioning from a passive configuration mode to an active configuration mode in response to the failure of the first gateway device, for instance as illustrated in FIG. 3. Some examples can include transitioning from a standby configuration mode to an active configuration mode in response to the failure of the first gateway device, for instance as illustrated in FIG. 2. In such an example, method 550 can include assuming an identity of the first gateway device in response to the failure of the first gateway device.

In some examples, controlling a first portion of the connection point device can include actively processing a first set of data associated with a managed device communicatively coupled to the connection point device, and taking control from the first gateway device comprises actively processing the first set of data and actively processing a second set of data processed by the first gateway device prior to the failure. In such an example, both the first and the second gateway devices may be in an active configuration mode prior to failure of the first gateway device.

In the foregoing detailed description of the present disclosure, reference is made to the accompanying drawings that form a part hereof, and in which is shown by way of illustration how examples of the disclosure can be practiced. These examples are described in sufficient detail to enable those of ordinary skill in the art to practice the examples of this disclosure, and it is to be understood that other examples can be utilized and that process, electrical, and/or structural changes can be made without departing from the scope of the present disclosure.

The figures herein follow a numbering convention in which the first digit corresponds to the drawing figure number and the remaining digits identify an element or component in the drawing. For example, "106" may reference element "06" in FIG. 1, and a similar element may be referenced as 206 in FIG. 2. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense.

What is claimed:

1. A method, comprising:
communicating with a first gateway device, wherein the first gateway device is communicatively coupled to a connection point device connectable to a managed device;
controlling a first portion of the connection point device;
causing a second gateway device to transition from a standby configuration mode or passive configuration mode to active configuration mode in response to a failure of the first gateway device; and
taking control from the first gateway device of a second portion of the connection point device in response to the failure of the first gateway device.

2. The method of claim 1, wherein the first gateway device is an Internet of Things (IoT) gateway device.

3. The method of claim 1, wherein the connection point device is an input/output (I/O) device.

4. The method of claim 1, further comprising transitioning from a passive configuration mode to an active configuration mode in response to the failure of the first gateway device, the passive configuration mode to actively share state information with the first gateway device via connection while not actively processing data associated with the managed device.

5. The method of claim 1, further comprising transitioning from a standby configuration mode to an active configuration mode in response to the failure of the first gateway device, the standby configuration mode to, while not fully booted, monitor a state of the connection point device.

6. The method of claim 1, further comprising assuming an identity of the first gateway device in response to the failure of the first gateway device.

7. The method of claim 1, wherein:
controlling a first portion of the connection point device comprises actively processing a first set of data associated with the managed device communicatively coupled to the connection point device; and
taking control from the first gateway device comprises actively processing the first set of data and actively processing a second set of data processed by the first gateway device prior to the failure.

8. A system, comprising:
an input/output (I/O) connection point device communicatively coupled to a managed device by a physical connection, a first Internet of Things (IoT) gateway device, and a second IoT gateway device, wherein the first and second IoT gateway devices are transitionable among standby configuration, passive configuration, and active configuration;
the first IoT gateway device to:
actively process a first set of data associated with the managed device; and
actively share state information with the second IoT gateway device via a non-routable connection; and
the second IoT gateway device to:
actively process a second set of data associated with the managed device;
actively share state information with the first IoT gateway device via the non-routable connection; and
process the first set of data and the second set of data in response to a failure of the first IoT gateway device.

9. The system of claim 8, further comprising the second IoT gateway device to; in response to the failure of the first IoT gateway device, take control of ports of the I/O connection point device controlled by the first IoT device before the failure of the first IoT gateway device.

10. The system of claim 8, wherein the I/O connection point device is communicatively coupled to the first IoT gateway device via a first physical connection, and to the second IoT gateway device via a second physical connection.

11. The system of claim 8, wherein the managed device is a routable managed device.

12. The system of claim 8, wherein the managed device is a non-routable managed device.

13. A system, comprising:
an input/output (I/O) connection point device communicatively coupled to a non-routable managed device by a physical connection; a first Internet of Things (IoT) gateway device, and a second IoT gateway device;
a cloud service communicatively coupled to the first IoT gateway device and the second IoT gateway device;
the first IoT gateway device to:
actively process a set of data associated with the non-routable managed device;
actively communicate the processed set of data with the cloud service; and
actively share state information with the second IoT gateway device via a non-routable connection; and
the second IoT gateway device to:
actively share state information with the first IoT gateway device via the non-routable connection;
transition from a passive or standby mode to an active mode; and
process the set of data and communicate the processed set of data with the cloud service in response to a failure of the first IoT gateway device.

14. The system of claim 13, further comprising:
the first IoT gateway device to monitor, via a first daemon, a connection to the second IoT gateway device and a connection to the I/O connection point device; and
the second IoT gateway device to monitor, via a second daemon, a connection to the first IoT gateway device and a connection to the I/O connection point device.

15. The system of claim 13, wherein the second IoT gateway device includes instructions executable by a processing resource to transition the second IoT gateway device from a passive configuration mode to an active configuration mode in response to the failure of the first IoT gateway device.

16. The system of claim 13, wherein the second IoT gateway device includes instructions executable by a processing resource to:
cause, in response to the failure of the first IoT gateway device, the second IoT gateway to complete a boot process to transition to an active configuration mode.

17. The system of claim 13, wherein the second IoT gateway device includes instructions executable by a processing resource to:
cause, in response to the failure of the first IoT gateway device, the second IoT gateway device to be named equivalent to the first IoT gateway device.

18. The system of claim 13, wherein the second IoT gateway device includes instructions executable by a processing resource to:
cause, in response to the failure of the first IoT gateway device, the second IoT to transition to a configuration with properties of the first IoT gateway device.

* * * * *